US012609219B2

(12) United States Patent
Jun et al.

(10) Patent No.: US 12,609,219 B2
(45) Date of Patent: Apr. 21, 2026

(54) COLD SPRAY PRINTED FLEXIBLE ELECTRONICS AND METHOD FOR MANUFACTURING THE SAME

(71) Applicant: Purdue Research Foundation, West Lafayette, IN (US)

(72) Inventors: Martin Byung-Guk Jun, West Lafayette, IN (US); Semih Akin, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 206 days.

(21) Appl. No.: 18/526,069

(22) Filed: Dec. 1, 2023

(65) Prior Publication Data

US 2024/0194377 A1     Jun. 13, 2024

Related U.S. Application Data

(60) Provisional application No. 63/386,357, filed on Dec. 7, 2022.

(51) Int. Cl.
| | |
|---|---|
| *H01B 13/32* | (2006.01) |
| *B33Y 10/00* | (2015.01) |
| *H01B 5/14* | (2006.01) |
| *H01B 13/00* | (2006.01) |

(52) U.S. Cl.
CPC ........... *H01B 13/321* (2013.01); *B33Y 10/00* (2014.12); *H01B 5/14* (2013.01); *H01B 13/0026* (2013.01)

(58) Field of Classification Search
None
See application file for complete search history.

(56) References Cited

U.S. PATENT DOCUMENTS

2025/0016931 A1*    1/2025   Rivera ................... H05K 1/189

FOREIGN PATENT DOCUMENTS

CN           118116647  A  *   5/2024   ............. B25J 19/00

OTHER PUBLICATIONS

CN 118116647 A Translation (Year: 2025).*

* cited by examiner

*Primary Examiner* — Timothy J Thompson
*Assistant Examiner* — John B Freal
(74) *Attorney, Agent, or Firm* — David E. Novak; Brannon Sowers & Cracraft PC

(57)     ABSTRACT

A flexible electrode device, including a typically thin film polymer layer, a typically thin film metal layer bonded to the polymer layer to yield a composite strip, and a polymer substrate ultrasonically welded to the composite strip to yield a flexible electrode device. The flexible electrode device exhibits electrical conductivity of at least $1.08 \times 10^6$ $S \cdot m^{-1}$, at least 60% tensile elongation, and less than 5% change in the $R/R_0$ after 50 peeling cycles. The flexible electrode is formed without annealing and is formed under ambient pressure and temperature conditions. The flexible electrode device can have any convenient shape.

3 Claims, 16 Drawing Sheets

(1) Cold spray metallization     (2) Laser cutting     (3) Ultrasonic welding

Kapton (PI) film

Fig. 10

COLD SPRAY PRINTED FLEXIBLE ELECTRONICS AND METHOD FOR MANUFACTURING THE SAME

CROSS REFERENCE TO RELATED APPLICATIONS

The present patent application claims priority to then U.S. Provisional Patent Application Ser. No. 63/386,357, filed on Dec. 7, 2022, the disclosure of which is incorporated herein by reference.

TECHNICAL FIELD

The present novel technology relates generally to the field of manufacturing and, more particularly, to a cold spray technique for manufacturing printed flexible electronics, and the electronics manufactured according to the same.

BACKGROUND

Flexible electronics (FE) are of particular interest in smart films, wearable sensors, robotics, energy harvesting, food packaging, optoelectronics, and the like, owing to its unique characteristics, which include recyclability, durability, low-carbon footprint, cost-effectiveness, and compatibility with soft materials and curvilinear surfaces. These important features of FE enable high-fidelity performance over conventional wafer and circuit board technologies. FE are generally produced through additive patterning of functional coating materials, such as nanomaterial inks, on a flexible target surface in various designs. Traditional patterning approaches to produce FE mainly involve inkjet printing, screen printing, gravure printing, blade printing, aerosol jet printing, or hybrid printing methods. In these approaches, functional coating materials are transferred onto the target surface either by physical contact (screen printing, gravure printing) or non-contact (inkjet printing, aerosol jet printing).

In the production of FE, precise control of the patterning at high spatial resolution ensures the mechanical and electrical reliability of the resultant FE to achieve high-performance electronic devices. Despite great advances, traditional manufacturing approaches have limitations in achieving ultra-fine patterning without the need for a dedicated mask and/or vacuum equipment. Moreover, conventional printing methods often suffer from low adhesion strength and poor conductivity, thereby necessitating a high-temperature post-annealing process such as calcining or sintering to increase the adhesion strength and conductivity of the resultant printings. Post-annealing processes, however, lead to fast oxidation of the functional coatings while increasing the manufacturing cost. Also, post-annealing limits the use of low-thermal budget flexible substrates such as polyethylene terephthalate (PET) and polyethylene naphthalate (PEN), which are highly demanded substrates in FE owing to their inherent advantages (optical transparency, variable thickness, low-cost, recyclability, and the like). As such, to confront the abovementioned challenges, a non-traditional manufacturing approach that enables high-throughput production of high-resolution FE at low processing temperatures with enhanced electrical conductivity and adhesion strength is needed. The present novel technology addresses this need.

SUMMARY

The present novel technology relates to a novel manufacturing route is proposed for printed flexible electronics (FE).

A cold spray technique is used for direct conductive metallization on flexible off-the-shelf polymers. Custom-designed high-resolution FE with excellent electrical conductivity (typically at least $1.08 \times 10^6$ S·m$^{-1}$) and adhesion strength is achieved. The applicability of the novel route is also validated for thermosetting polymer substrates.

| Nomenclature | | | |
|---|---|---|---|
| Symbol | Description | Abbreviations | Description |
| A | Area | CS | Cold spray |
| L | Length | FE | Flexible electronics |
| P | Power | OM | Optical microscopy |
| R | Resistance | PET | Polyethylene terephthalate |
| $R/R_0$ | Relative resistance | PEN | Polyethylene naphthalate |
| $R_s$ | Sheet resistance | PI | Polyimide |
| t | Thickness | SEM | Scanning electron microscopy |
| w | width | Sn | Tin |
| $\rho$ | Resistivity | UTS | Ultimate tensile strength |
| $\Omega$ | Ohm | UW | Ultrasonic welding |

Hereinbelow, a cold spray-based novel manufacturing route that enables custom production of flexible electronics (FE) at high spatial resolution without a need of high-temperature post-sintering process is described in detail. The instant manufacturing route sequentially comprises: (1) cold spray metallization; (2) femtosecond laser machining; and (3) ultrasonic welding. First, the flexible polymer (such as PET) surface is metallized by cold spray direct writing of tin (Sn) particles under vacuum- and mask-free conditions. The as-metallized polymer film is then precisely cut into custom designed high-resolution electrodes, for example 500 μm linewidth, by femtosecond laser machining. Lastly, the laser-cut electrodes are joined onto a base polymer substrate via ultrasonic welding to constitute mechanically resilient and conformal FE. In this way, the route enables the exploitation of unique features of cold spray deposits in FE, including strong adhesion, high conductivity, minimal thermal input and the like. The resultant printings show excellent electrical conductivity (at least $1.08 \times 10^6$ S·m$^{-1}$), flexibility (60% elongation), and adhesion strength without significantly compromising intrinsic polymer and functional coating properties. Moreover, a serpentine-shaped flexible micro-heater ($10 \times 10$ mm$^2$) is also fabricated to demonstrate the viability of the introduced platform in flexible microelectronics. The instant novel technology provides a promising route toward the rapid, scalable, and cost-effective production of high-resolution and high-performance FE in a mechanically resilient and conformal manner.

In one embodiment, a cold spray (CS)-based manufacturing approach includes a cold spray (CS) technique for creating free-form electronic circuitry on 3-D printed polymers. The manufacturing process can be summarized as follows: First, the 3-D printed polymer (PLA) parts are accurately produced by a traditional material extrusion-based 3D printer (see FIG. 10). This process includes the incorporation of groove patterns for the precise circuitry design. The grooves feature 1 mm linewidth and a 1.5 mm depth. In the second step, the surface of the 3-D printed part is metallized through the CS particle deposition, with tin (Sn) serving as the functional coating material. The high-speed impinging of particles during the CS process allows the particles to penetrate into the grooves, leading to the formation of electrically conductive metallization within the groove structures. In the final step, the as-CS surface is polished ($\approx 0.5$ mm) to remove the Sn layer from the surface while retaining the electrodes inside the grooves. Consequently, this approach enables the creation of free-form electrical circuitry on 3-D printed polymer parts, ensuring consistent and homogeneous electrical conductivity for the development of 3-D plastronic devices. FIG. 11 showcases a light-emitting-diode (LED) blinking circuit designed on the 3-D printed freeform polymer part, confirming the electrical conductivity of the resulting circuitry.

It is worth noting that this approach extents beyond 3-D printed polymer parts; it can be also applied to various commercial thermoplastic polymers, including ABS, PLA, PEEK, and more. Unlike the conventional polymer metallization techniques, this innovative approach eliminates the need for chemical etching or costly palladium (Pd) seeding processes, making it an eco-friendly choice for 3-D printed electronics. Furthermore, by utilizing the cost-effective functional coating material (Sn powders=39$lb) and a high-throughput surface manufacturing technique (cold spray), the proposed method offers a cost-effective solution for 3-D printed parts with integrated electronic circuits.

BRIEF DESCRIPTION OF THE DRAWINGS

Figure 10:
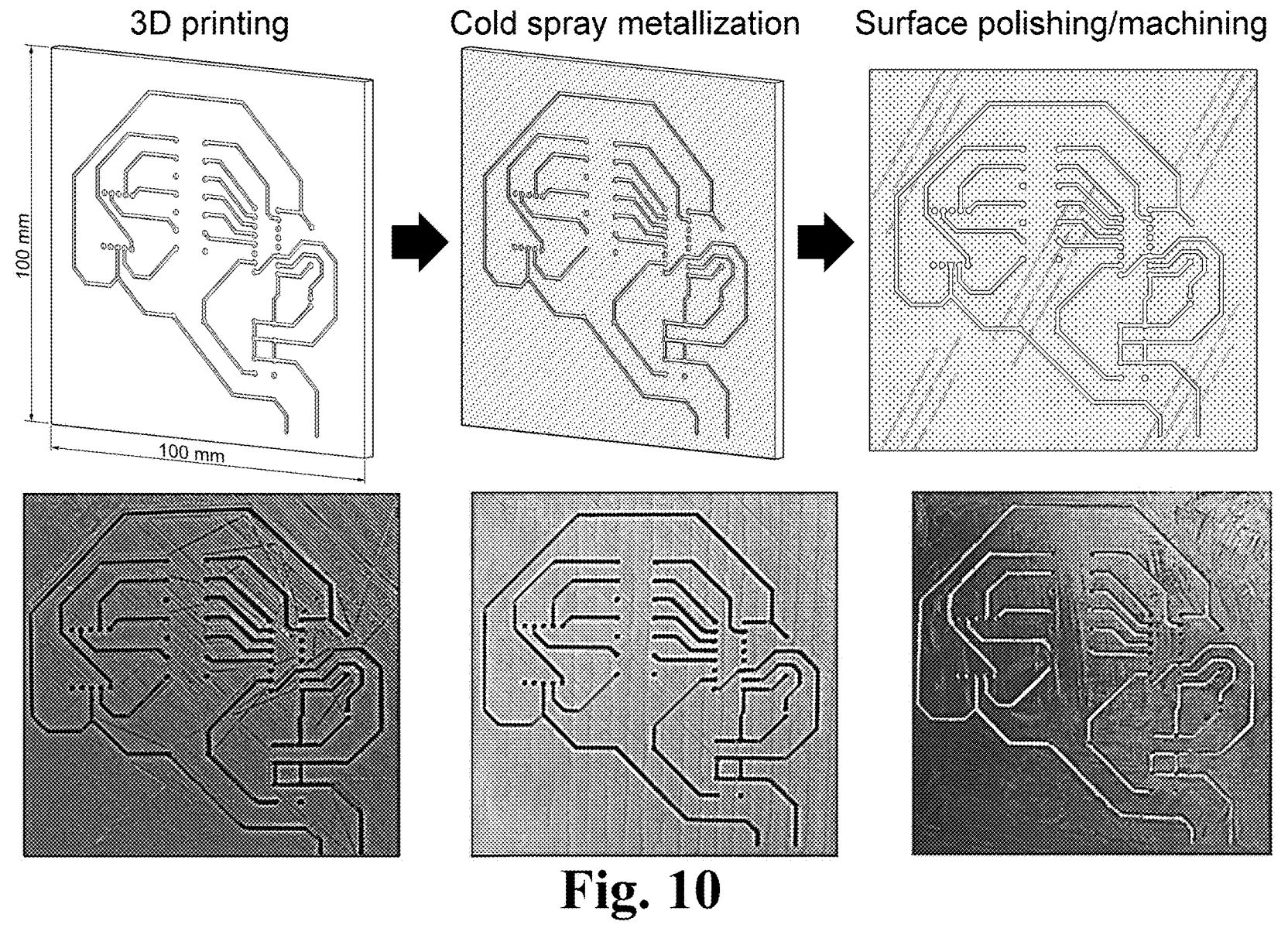

FIG. 10 Schematic of a manufacturing approach (top panel) with representative images (bottom panels).

DETAILED DESCRIPTION

Figure 1:
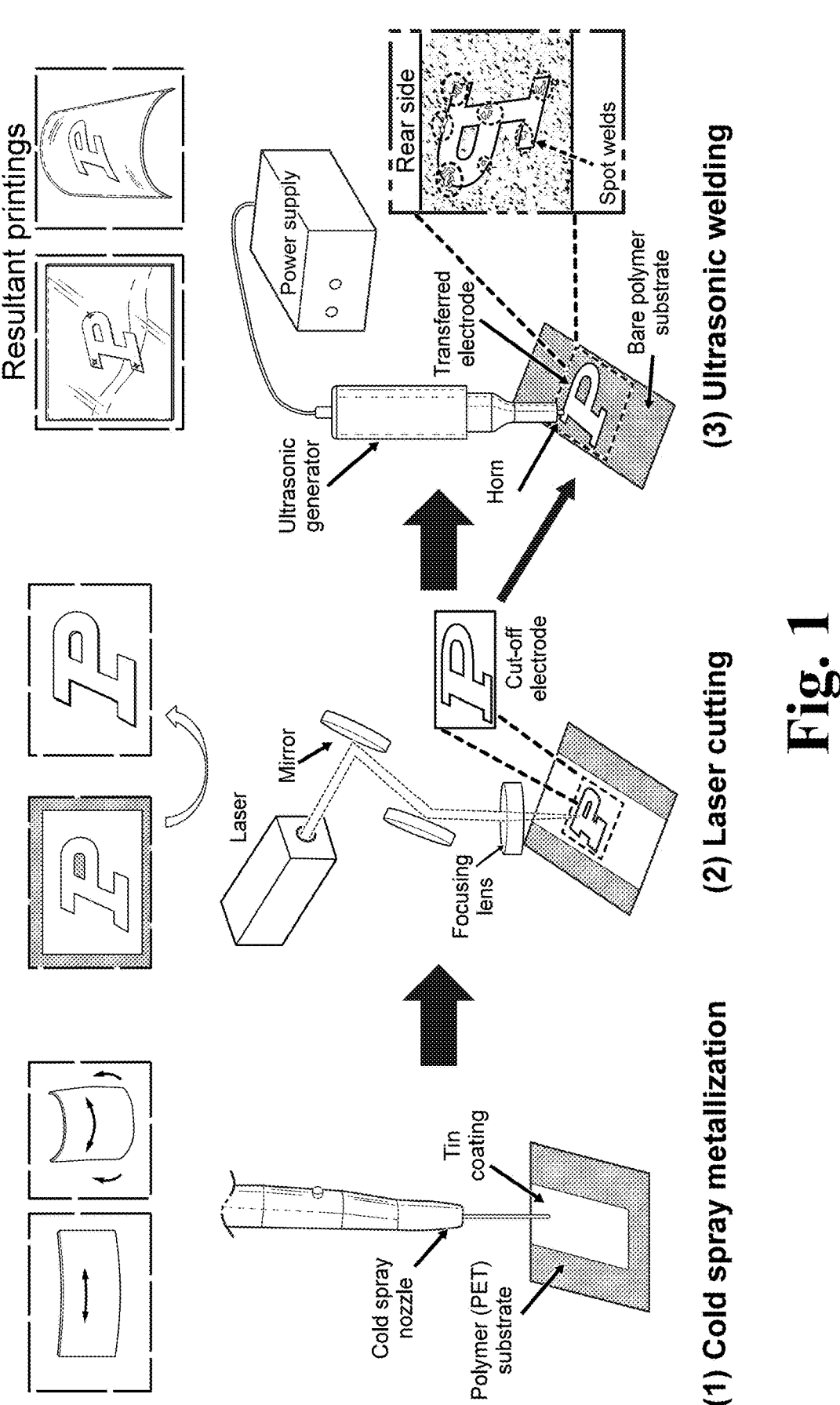
FIG. 1 is a schematic drawing of a manufacturing process to yield the first embodiment of the present novel technology, a room temperature and pressure process to yield high resolution flexible microelectronic device.

Before the present methods, implementations, and systems are disclosed and described, it is to be understood that this invention is not limited to specific synthetic methods, specific components, implementation, or to particular compositions, and as such may, of course, vary. It is also to be understood that the terminology used herein is for the purpose of describing particular implementations only and is not intended to be limiting.

As used in the specification and the claims, the singular forms "a," "an" and "the" include plural referents unless the context clearly dictates otherwise. Ranges may be expressed in ways including from "about" one particular value, and/or to "about" another particular value. When such a range is expressed, another implementation may include from the one particular value and/or to the other particular value. Similarly, when values are expressed as approximations, for example by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. Similarly, "typical" or "typically" means that the subsequently described event or circumstance often though may not occur, and that the description includes instances where said event or circumstance occurs and instances where it does not.

The instant novel technology relates to a cold spray (CS) particle deposition technique for rapid and scalable production of FE, and viable results have been achieved. More specifically, owing to unique features of the CS technique (e.g., low-process temperature, strong adhesion strength, scalability, high deposition rate), millimeter-scale tin (Sn) electrodes were directly fabricated on a flexible polymer surface (PET) at low-operating temperatures (i.e., <80° C.). In the same study, to address the low-resolution of CS, a subsequent femtosecond laser machining process was also conducted to achieve micron-scale flexible electrodes. Despite these successes, the fabricated microelectrodes through this approach suffer from poor mechanical resilience and conformity due to the electrodes' ultra-thin features. In detail, these ultra-fine electrodes over-hang without the support of a base-substrate, thereby limiting its use in practical FE applications. As such, after laser cutting, transferring the microelectrodes on a base polymer substrate is a helpful step to exploit the unique properties of the CS process (i.e., high deposition rate, strong adhesion strength, no need for post-sintering) in producing compact, resilient, and conformal flexible microelectronics.

FIG. 1 thru 9B illustrate embodiments of the present novel technology. In the current novel technology, to fill the aforementioned critical gap a novel manufacturing route was developed to enable exploitation of the unique features of the CS technique in FE. The novel manufacturing route sequentially involves 1) cold spray metallization, 2) femtosecond laser machining, and 3) ultrasonic welding processes to produce custom-designed FE at ambient conditions in a mask-free and vacuum-free fashion. The surface of the flexible polymer (PET) is conductively metallized by the direct CS writing of Sn particles. As-metallized PET samples are then precisely cut into desired shapes to define designed high-resolution electrodes by laser machining. Lastly, the cut-off electrodes are transferred onto a base polymer (PET) substrate via ultrasonic welding. The UW welding process ensures conformal and intimate contact of the electrodes on the base polymer substrate with improved mechanical resilience. The resultant electrode printings are comprehensively characterized in terms of microstructure, mechanical strength, electrical conductivity, and adhesion strength. Leveraging the process settings, a flexible micro-heater ($10 \times 10$ mm$^2$) was also fabricated to demonstrate the viability and applicability of the proposed manufacturing platform in flexible microelectronics. Moreover, the feasibility of the proposed approach is evaluated for a thermoset substrate material such as Kapton (polyimide) film, which is another highly demanded material for wearable electronics and smart film applications (Kapton is a registered trademark of the E. I. du Pont de Nemours and Company CORPORATION DELAWARE Chestnut Run Plaza, 974 Centre Road Wilmington DELAWARE 19805, registration number 5281979, Sep. 5, 2017). One novel and innovative contribution of the present novel technology is the development of a complete CS-based manufacturing approach for custom-design, high-resolution, resilient, and conformal FE without the need for a post-sintering process.

Tin (Sn) particles were used as the cold spray (CS) feedstock material owing to its corrosion resistance, soft nature (HV=11), low melting point ($232°$ C.), and sprayability on various substrates; of course, other convenient metals, alloys, electrically conductive composites and the like may be selected as the feedstock. These features of the Sn particles facilitate the metallurgical bonding of the particles on the target surface, which allows for electrically conductive functional printing or coating on various polymers, such as ABS, PEEK, CFRP, PET, PTFE, PI, combinations thereof and the like. As for the substrate material, polyethylene terephthalate (PET) polymer sheet (0.25 mm in thickness) was employed as a flexible substrate due to its inherent advantages in printed electronics including low-cost, optical transparency, recyclability, and the like, although other convenient flexible materials such as polymers, composites, and the like may be selected. The surface of PET samples was cleaned before and after each process steps to prevent possible FIG. 1A illustrates the proposed manufacturing route that sequentially involves: (1) CS metallization of the polymer substrate; (2) femtosecond laser machining (cutting) of the as-cold sprayed samples into arbitrary-designed electrodes (herein, the Purdue University logo); and (3) transferring the laser-cut electrodes onto the base PET substrate via ultrasonic welding. Unlike traditional manufacturing methods, the described approach is mask-free, and all the process steps are conducted under ambient conditions. Below, the detailed experimental procedures for each embodiments are elaborated. Note that in the present study, the term "as-cold spayed" refers to solely cold spray metallized polymer, while the language "resultant printing" corresponds to the ultrasonically welded electrodes on the base polymer surface right after laser cutting.

Figures 2A, 2B:
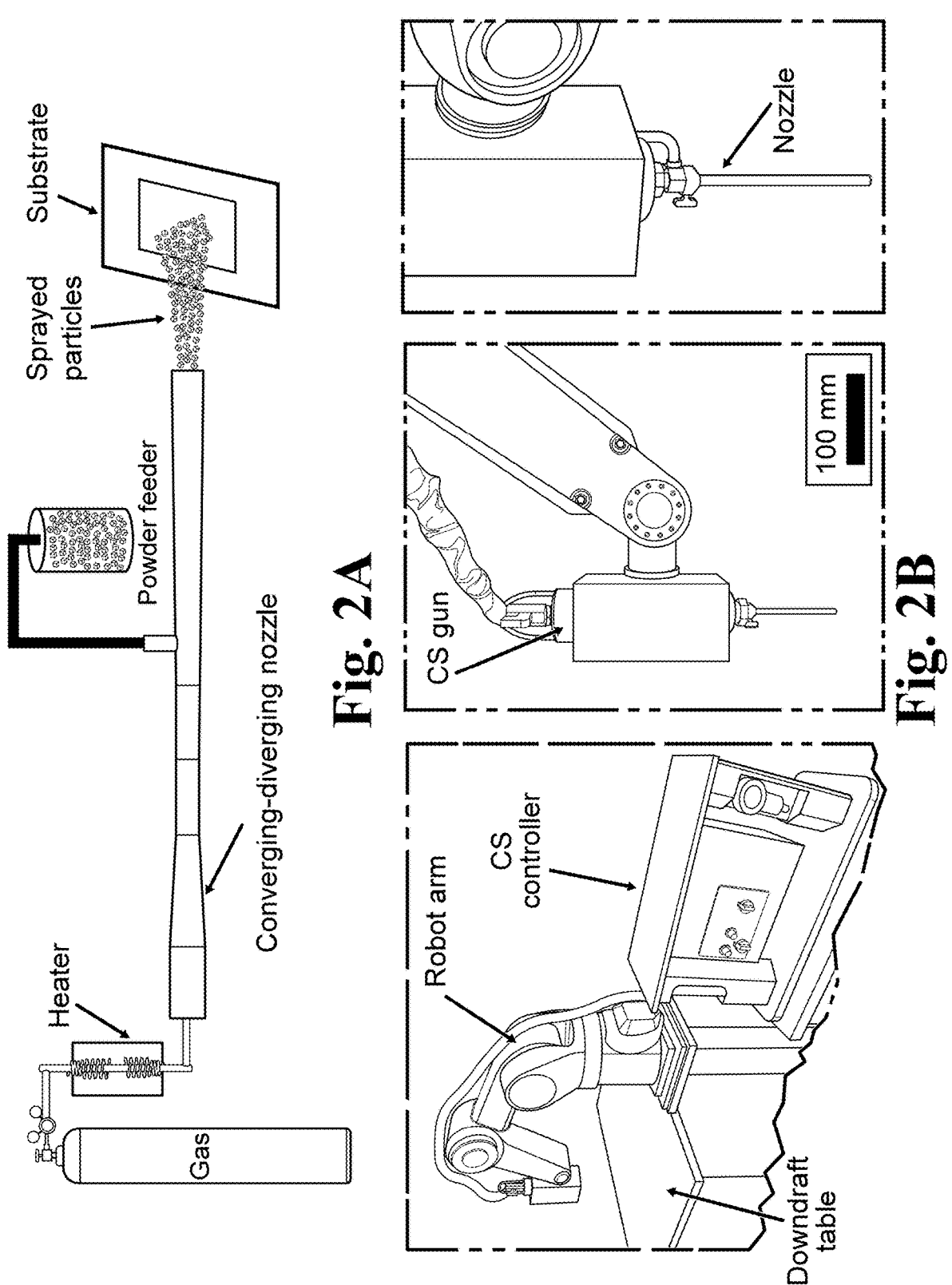
FIG. 2A is a schematic of a typical low-pressure cold spray process of FIG. 1.
FIG. 2B is a perspective view of the system of FIG. 1.

Cold spray (CS) is an emerging solid-state surface metallization technique on various substrates. CS relies on the high-speed impact of particles, typically micron-scale metal particles onto a target surface at low temperatures. In the CS technique, as shown in FIG. 2A, the particles are accelerated to high-velocities, typically supersonic, through a converging-diverging nozzle, then impact a target surface. Under the high-speed impingement, the particles' kinetic energy dissipates over the substrate surface, resulting in a high-strength functional coating/printing. Given its high-throughput, scalability, and cost-effectiveness, CS is a promising technique for rapid metallization on numerous surfaces.

In the present novel technology, as shown in FIG. 2B, a low-pressure CS machine with the axisymmetric nozzle configuration was used for particle deposition. To precisely control the CS process, the nozzle gun was mounted on a programmable multi-axis robot arm. Micron-scale Sn particles were cold sprayed on the PET surface to achieve millimeter-scale electrodes by direct writing of the Sn particles. The operational parameters of each procedure in the exemplary manufacturing route are listed in Table 1.

TABLE 1

Experimental parameters and their settings.

| Procedure | Parameter | Setting | Unit |
|---|---|---|---|
| (1) Cold spray | Driving gas type | Air | — |
| | Driving gas pressure | 0.7 | MPa |
| | Driving gas temperature | 80 | ° C. |
| | Powder feed rate | 0.2 | $g \cdot s^{-1}$ |
| | Nozzle transverse speed | 75 | $mm \cdot s^{-1}$ |
| | Spray distance | 10 | mm |
| | Number of spray pass | 1 | — |
| (2) Laser machining | Wavelength | 515 | nm |
| | Pulse duration | 229 | fs |
| | Repetition rate | 2 | kHz |
| | Pulse energy | 57 | μJ |
| (3) Ultrasonic welding | Power | 250-500 | W |
| | Frequency | 30 | kHz |
| | Weld time | 1 | s |

Cold spray metallized polymer samples were cut out by the laser machining (cutting) process to define custom-designed micron-scale electrodes. A femtosecond laser was employed to cut the as-cold sprayed polymer samples. Notably, the PET film is vulnerable to heat accumulation by the laser beam. Particularly, the laser pulse repetition larger than a threshold, herein >10 kHz, led to undesirable heat accumulation on the metallized PET layer, resulting in localized deformation and cracks in the Sn coating. Further increase in the laser repetition rate up to 60 kHz severely damaged the electrodes by propagating the heat-affected zone on the as-cold sprayed layer. Given these initial findings, we accordingly selected the laser parameters to cut out the as-cold sprayed PET film in a pre-programmed manner without delaminating the polymer substrate while minimizing the heat-affected zone. As such, the appropriate laser settings were occulted at the wavelength of 515 nm with a pulse duration of 229 fs, a repetition rate of 2 kHz, and pulse energy of 57 μJ.

Figure 3:
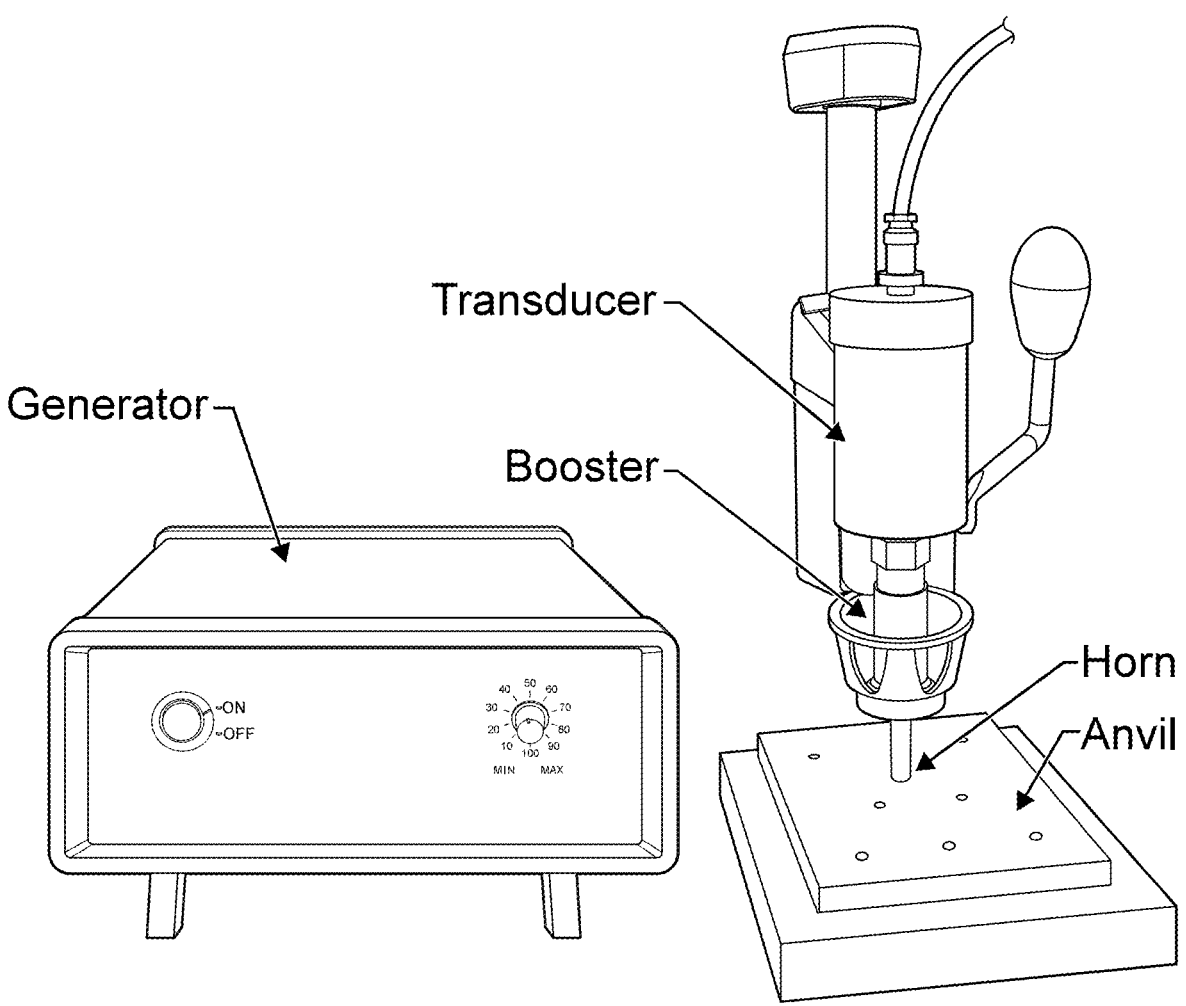
FIG. 3 is the ultrasonic welding setup of system of FIG. 1.

Although laser machining can enable cutting high-resolution, herein 30 μm linewidth, Sn electrodes through the PET substrate, it is desired to transfer the cut-off electrodes on a flexible base substrate to constitute compact and conformal FE devices. It is likewise desirable to improve the mechanical and structural resilience of the electrodes for fabricating high-performance FE. In this regard, the laser-cut samples were transferred (joint) on a base (bare) PET polymer surface using the ultrasonic welding (UW) technique to constitute high-resolution FE. UW was employed owing to its intrinsic advantages of ultra-fastness, excellent bond strength, minimal surface damage, and low-cost. An ultrasonic spot-welding setup that can provide a power of 500 W was to provide the embodiments. The laser-cut electrodes were spot welded on the polymer substrate from the rear side of the electrodes yielding polymer-to-polymer contact at a frequency of 30 kHz for 1 second for each spot. A representative image of the UW setup is shown in FIG. 3.

Scanning electron microscopy and optical microscopy were used to analyze the microstructure of the printing embodiments. The surface roughness of the as-cold sprayed samples was measured. A uniaxial tensile test machine was used to characterize the tensile strength of the resultant printing and the shear adhesion strength of the ultrasonic spot welds. A digital multimeter was used to measure the electrical resistance of the specimens. A four-point probe system was employed to measure the sheet resistance of the samples with a constant current of 100 mA at room temperature. A transparent tape test was conducted to investigate the adhesion strength of the printings. Bending tests were also performed for various bending radii to characterize the flexibility of the specimens. Lastly, an infrared (IR) camera was used to characterize the performance of the fabricated microheater. For quantitative characterizations such as 4-point probe, bending, tensile tests, three specimens for each test unit were considered to average the results with standard deviations. All the characterizations were conducted at room temperature.

The microstructure of the CS metallized polymers and resulting printings were investigated and determined. Next, characterizations of the mechanical strength of metallized polymers and the UW process were conducted. The electrical conductivity and adhesion strength of the resultant printings were then evaluated. Lastly, a flexible microheater was fabricated to demonstrate the viability of the proposed manufacturing route in FE.

Figure 4A:
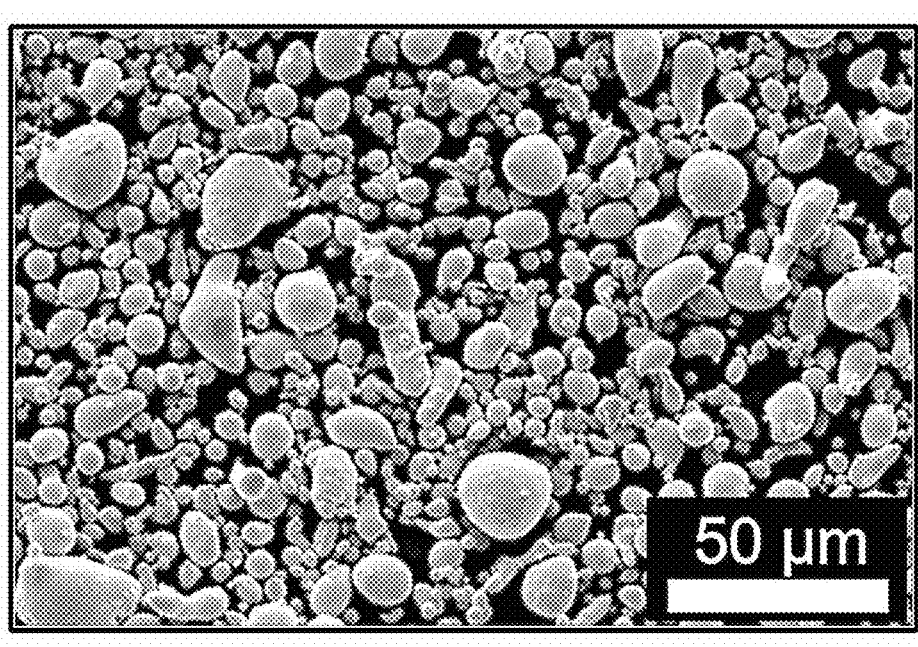
FIG. 4A illustrate the surface condition showing tin particle morphology of a device made according to FIG. 1.
Figure 4B:
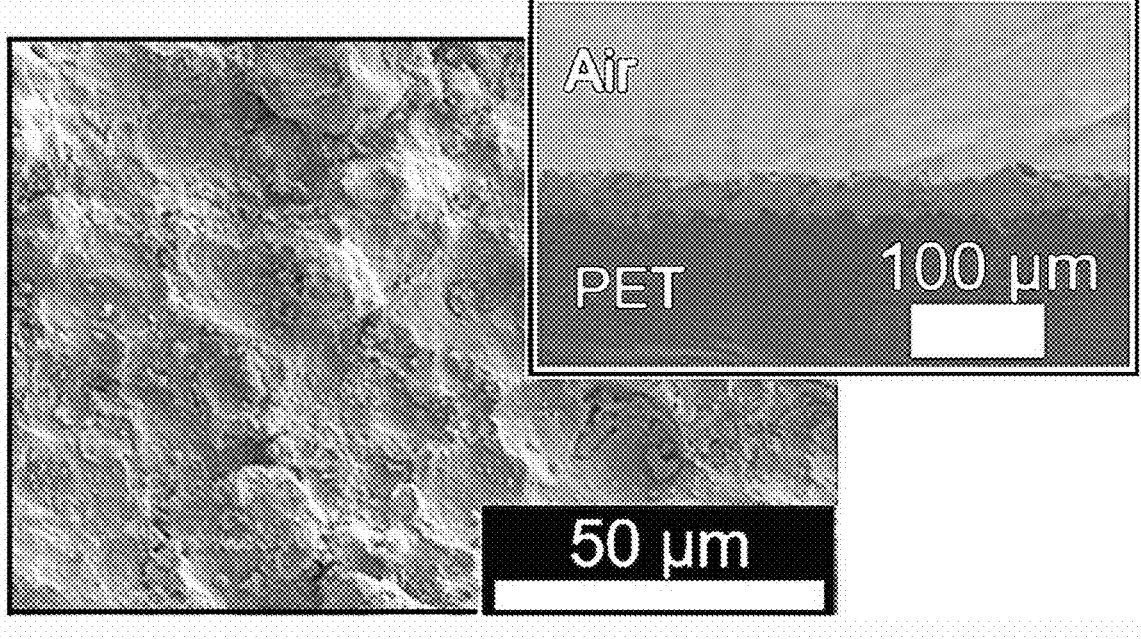
FIG. 4B graphically illustrates the microstructure of the as-cold sprayed PET surface.

FIG. 4A shows the morphology of the feedstock Sn particles used in the CS deposition experiments. The Sn particles are in a size range of 5-45 μm, having a quasi-spherical morphology. FIG. 4B presents the morphology of the as-cold sprayed PET surface. A dense self-bonded micro-rough ($R_a \approx 5.26$ μm) Sn layer on the polymer surface was achieved by CS at operational conditions given in Table 1. No significant crack, erosion, or porosity was observed on the as-cold sprayed layer, which indicates an effective CS particle deposition. The cross-sectional SEM image in FIG. 4B also shows a uniform coating layer on the PET surface with an average thickness of ≈35 μm. Here, it is noteworthy that the as-cold sprayed PET samples can be inherently used as millimeter-scale flexible electronics. As such, CS enables rapid and high-throughput deposition of millimeter-scale (i.e., ≈5 mm linewidth) electrodes on the flexible substrate (PET), thereby having the potential for macro-electronics applications.

Figure 4C:
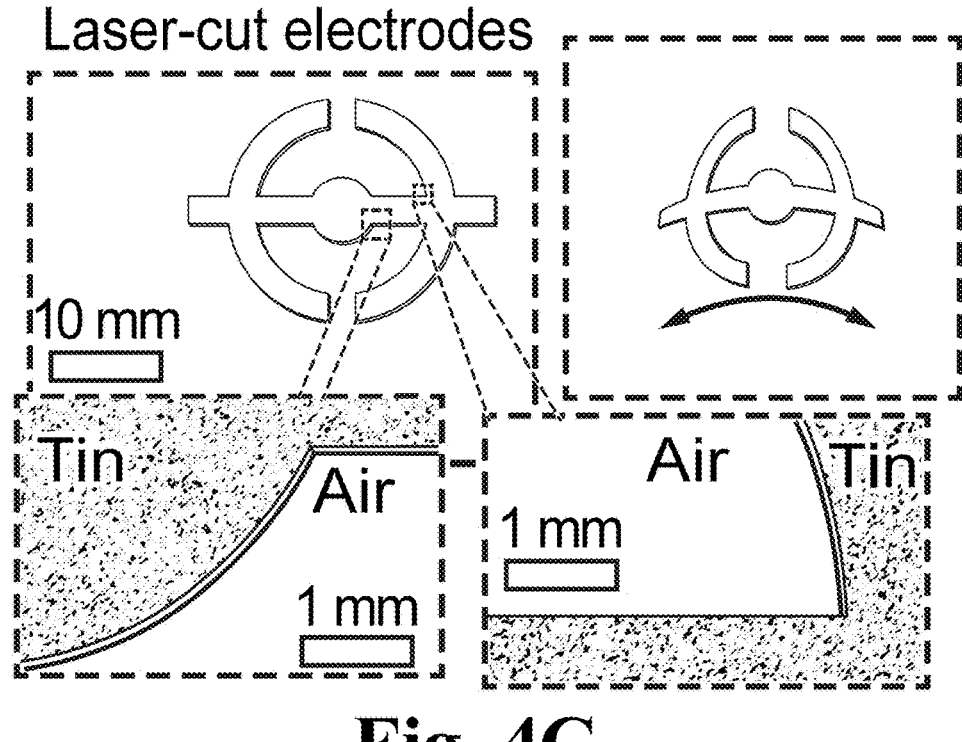
FIG. 4C graphically illustrates a laser-cut electrodes from metallized samples.
Figure 4D:
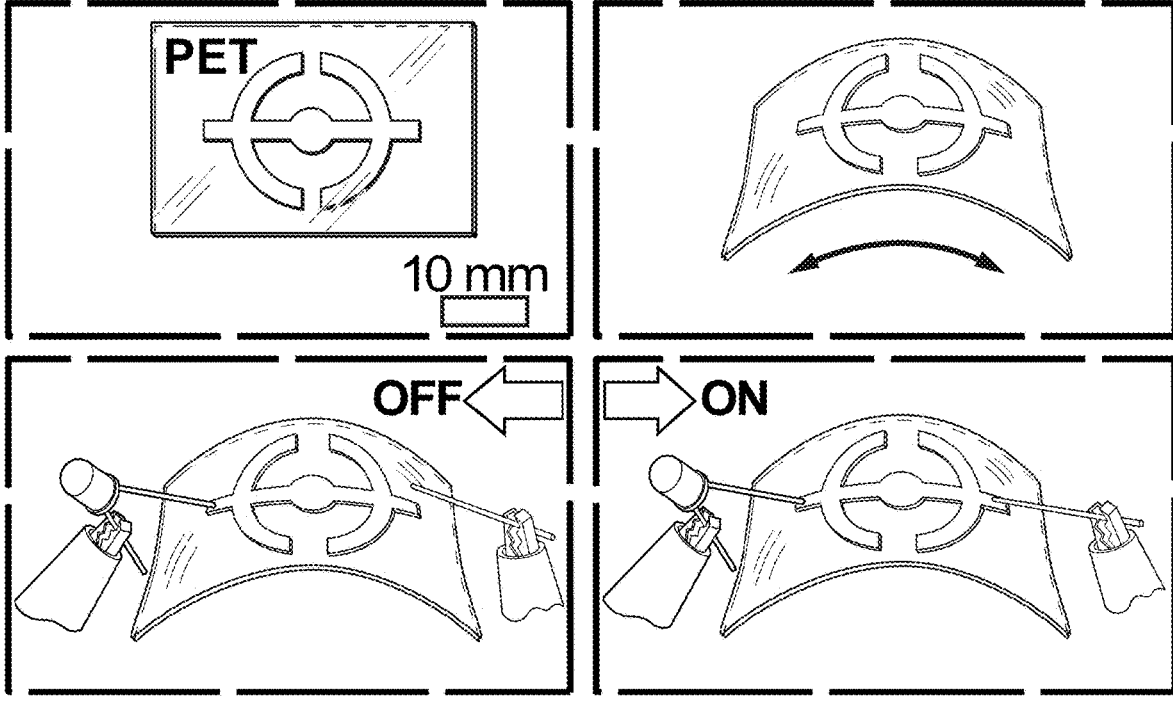
FIG. 4D graphically illustrates resultant printings after a UW process step.

FIGS. 4C-4D show the arbitrarily designed electrodes obtained by the laser-cutting and UW processes, respectively. The femtosecond laser machining enabled scaling-down of the as-cold sprayed Sn electrodes by achieving precise electrode dimensions with ultra-fine features. As seen in OM images in FIG. 4C no delamination was observed on the electrodes' surface after the laser-cutting process. Moreover, as shown in FIG. 4D, the resulting electrodes retained high flexibility after the UW process. The resultant printings remained highly conductive under bending deformation without any sign of delamination.

Figures 4E, 4F, 4G, 4H:
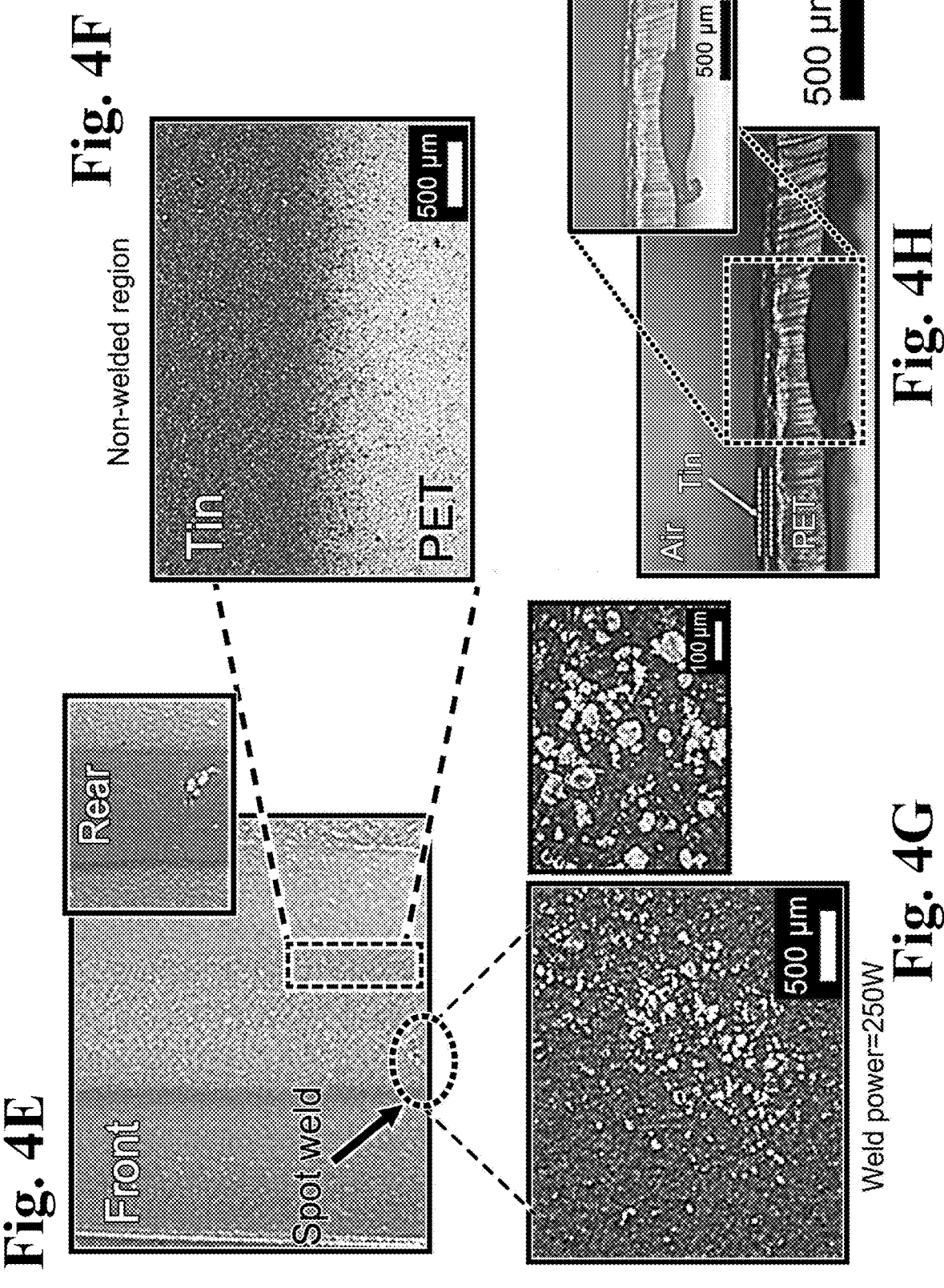
FIG. 4E graphically illustrates the welded as-cold sprayed sample on bare PET.
FIG. 4F graphically illustrates a non-welded region of the welded as-cold sprayed sample on bare PET.
FIG. 4G graphically illustrates a welded region of the welded as-cold sprayed sample on bare PET.
FIG. 4H graphically illustrates cross-section OM image of the welded section.

FIG. 4E presents the further microstructure characterization of the resultant printings. As seen in FIG. 4E-1, some flecks/marks were locally formed on the coating surface where the UW is applied; these are likely attributed to ultrasonic vibration during the welding process. In detail, the rear side of the base polymer (where the welding horn is contacted) was locally melted due to the mechanical vibrations, resulting in a heat intrusion into the coated layer. Hence, the morphology of the electrodes locally changed where the UW is applied. FIGS. 4E-1 thru 4E-3 show the surface OM images of the non-welded and welded regions on the printing, respectively. The deposited particles agglomerated by forming larger particles near the welding spot. To elaborate this phenomenon, the cross-section morphology of the welded section was investigated. As given in FIG. 4E-4, the contact region of the polymer surfaces was partially melted during the UW process due to the heat accumulation on the polymers. It is noteworthy that the melting pool does not reach the metallized surface, therefore resulting in no significant changes to the as-cold spayed Sn layer. The cross-section image taken near the welding region indicates a uniform metal coating on the PET surface, which also proves the non-disruptive effect of the UW process on the as-deposited metal layer. Besides, all the samples retained the intrinsic coating properties after UW welding without a noticeable difference in electrical conductivity. The effect of the UW process on the resulting printings is further discussed below.

The tensile strength of both bare and as-cold sprayed (metallized) PET samples was determined by the uniaxial tensile test according to the ASTM D882 standard test method for tensile properties of thin plastic sheeting. The joint (weld) lap shear strength at different welding powers was also characterized based on the ASTM D3163-01 standard. A uniaxial tensile test machine was used at a displacement rate of 50 mm/min, and each experiment was repeated three times. The representative images of the tensile set specimens and the test setups are presented in FIGS. 5A-5C.

Figure 5A:
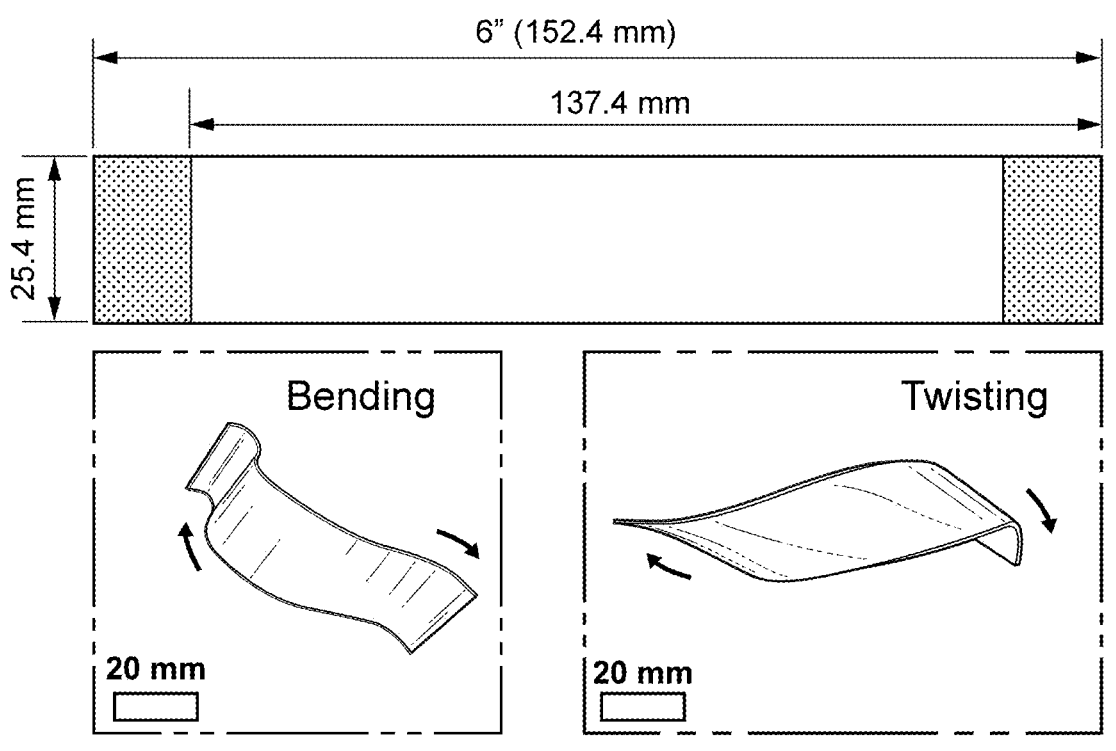
FIG. 5A is a graphic illustration of tensile test specimens a device made according to FIG. 1.
Figure 5B:
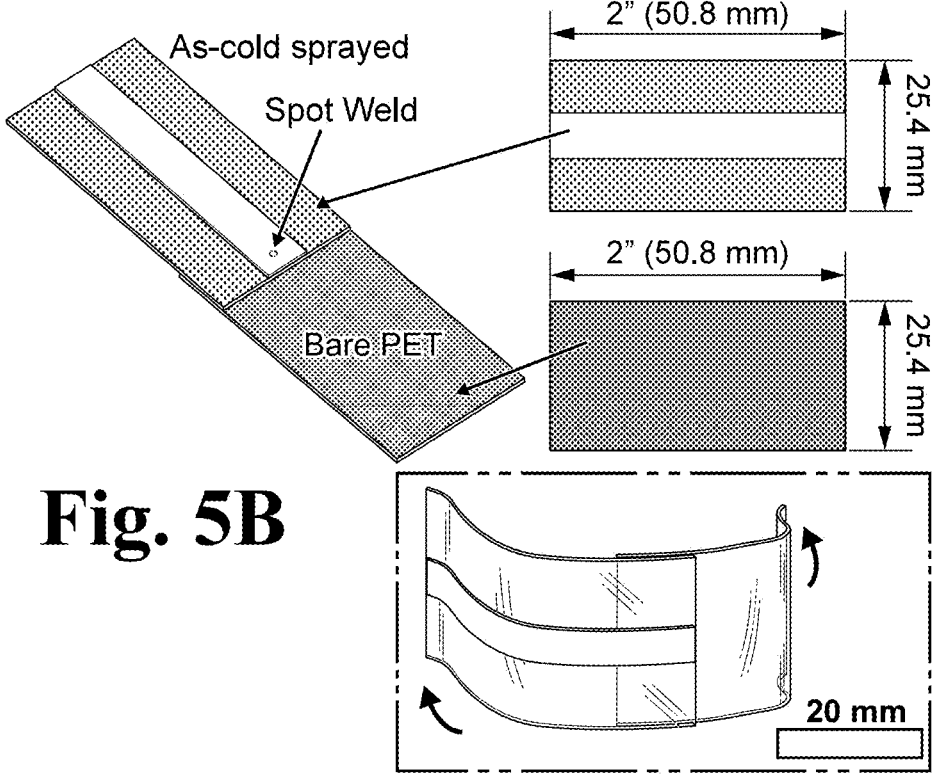
FIG. 5B graphically illustrates shear-lap test specimens.
Figure 5C:
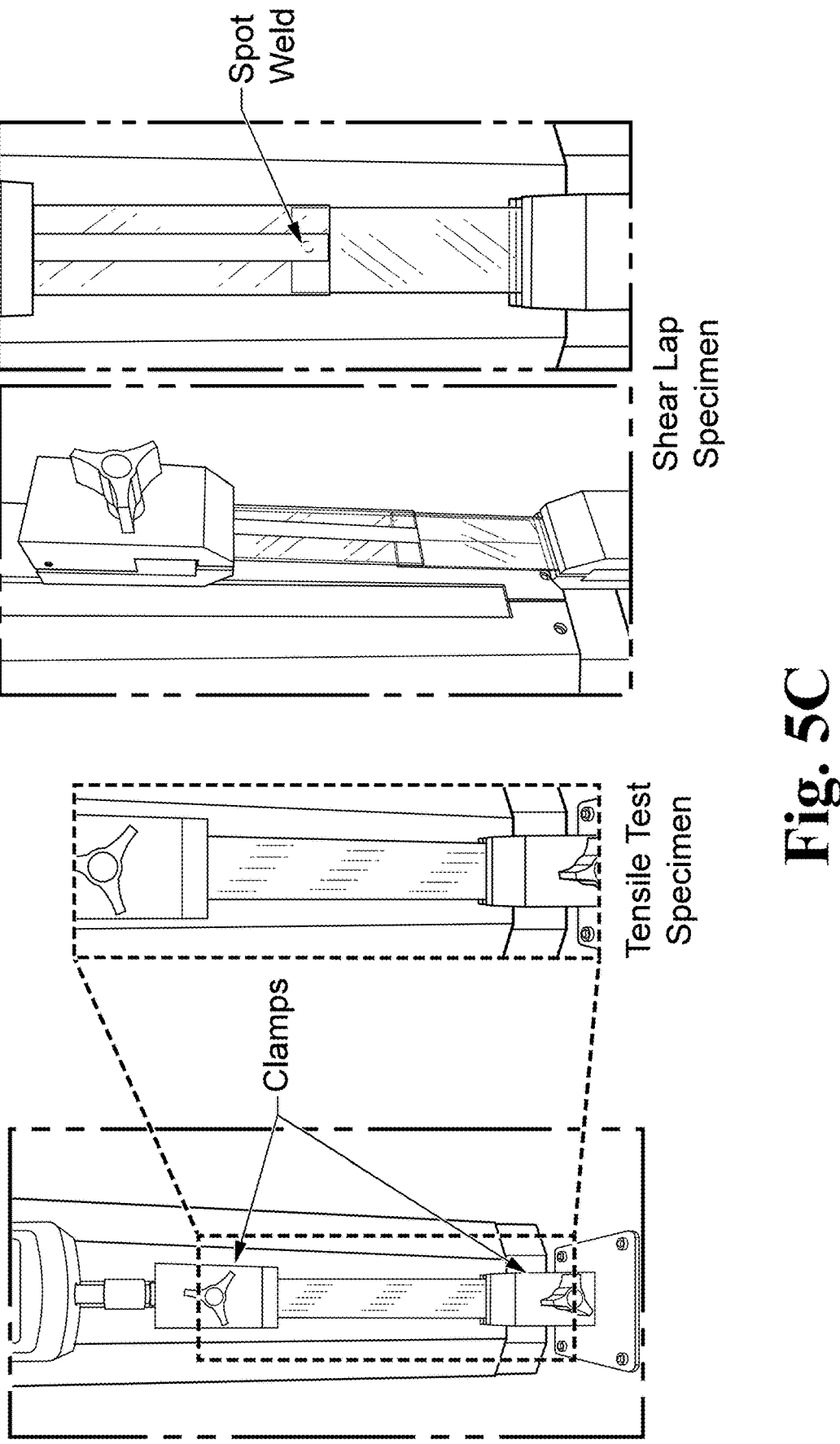
FIG. 5C graphically illustrates tensile test setups
Figures 5D, 5E:
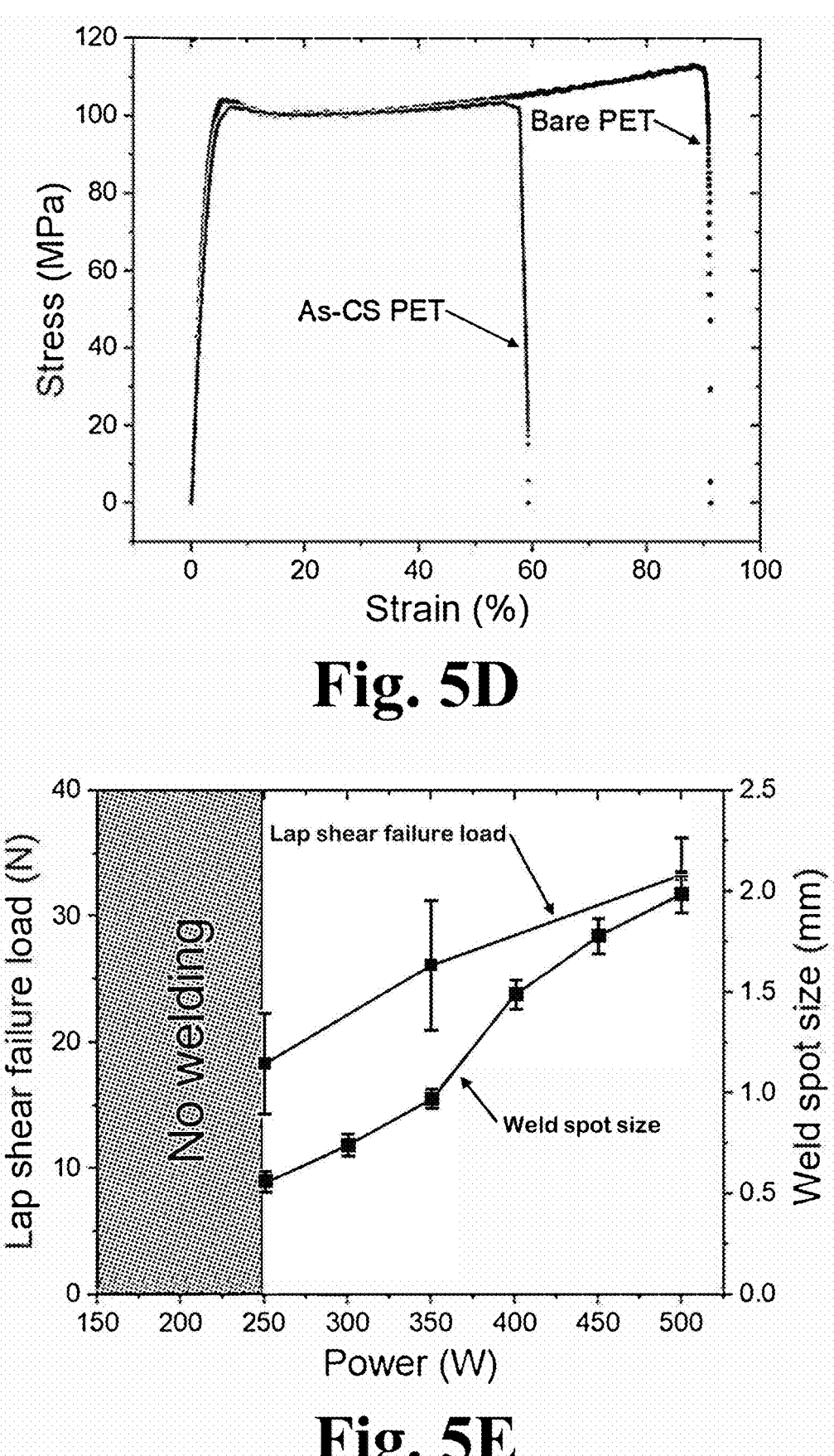
FIG. 5D graphically illustrates tensile test results for bare and as-cold sprayed PET samples.
FIG. 5E graphically illustrates lap shear strength and weld spot size variation at various ultrasonic welding powers.
Figure 6:
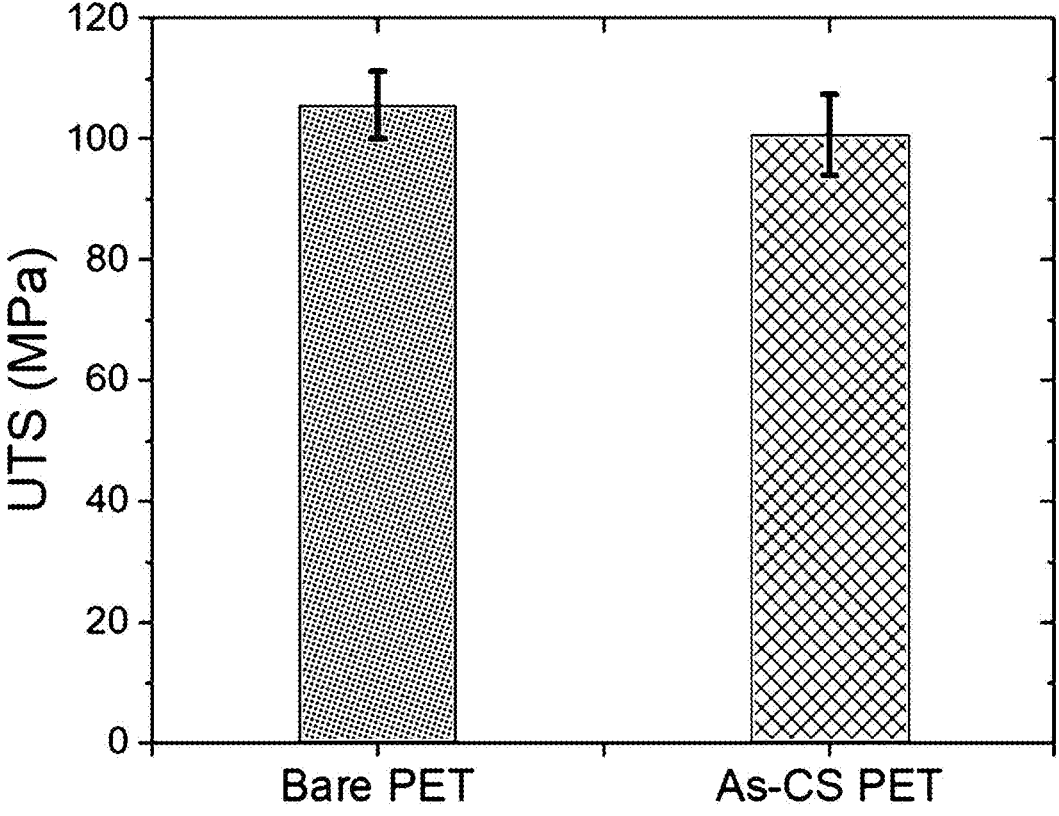
FIG. 6 graphically illustrates the ultimate tensile strength of the bare and as-cold sprayed PET samples.

FIG. 5D shows the engineering stress-strain curve of the bare and as-cold sprayed PET samples. As a noteworthy result, the bare PET showed better elongation (≈90% strain) as compared to the as-cold sprayed PET (≈60% strain). It is likely attributed to the dense and consolidated metal (Sn) layer on the PET surface (see FIG. 4B), which resulted in a decrease (≈33%) in the flexibility of the PET polymer after the CS process. The ultimate tensile strength (UTS), however, did not significantly alter for both bare and as-CS polymers. As seen in FIG. 6, bare PET samples have relatively larger (i.e., >5%) UTS than that of the as-cold sprayed samples. The reasons can be attributed to such local erosions on the as-metallized samples due to the high-speed impingement of the particles onto/into the polymer surface during the CS process. However, the erosion on the as-CS PET surface is negligible for FE applications when the overall UTS results are considered. As such, although the CS relatively reduced the flexibility of the PET polymer, the mechanical strength was maintained without significantly compromising the intrinsic polymer properties.

As for the ultrasonically welded electrodes, the effect of the welding input power on the weld spot size and the lap shear failure load was also investigated. FIG. 5e presents the influence of the welding power, defined as the electrical power applied, on weld spot size and lap shear strength at various input powers. Each welding was applied for 1 second at ambient conditions under the same loading conditions. No welding was observed at a power of <250 W, which is likely attributed to insufficient mechanical vibration to join the polymer surfaces to each other. Successful welding was achieved at the power of ≥250 W to weld the laser-cut electrodes on the substrate surface. However, an excessive rise in the power, such as to 500 W, resulted in disruptive welding due to high-energy transfer into the substrates. Moreover, a longer weld time, typically 2 seconds, increased the tendency of void formation on the electrode due to excessive mechanical energy intrusion into the substrates and the Sn coating.

In FIG. 5E, the effect of the input power on weld spot size was characterized, which was measured from the rear side of the substrate. As seen in FIG. 5D, the spot size increased with higher welding powers. The minimum average spot size was obtained at around 500-550 μm at an input power of 250 W. Here, it is noteworthy that the spot size strictly depends on the dimensions of the welding tip (see FIG. 3). In the present work, the UW process with a welding tip (horn) diameter of 8 mm at the welding power of 250 W resulted in an equivalent spot size (diameter) of 500-550 μm. It is important to note that smaller spot sizes may be achieved by using a narrower welding tip, which can further lead to higher-resolution, such as <500 μm linewidth, electrodes on the base polymer surface.

Lastly, the joint lap shear load at different welding powers was evaluated according to the ASTM D3163-01 standard. As seen in FIG. 5E, the lap shear failure load increased at higher weld powers. It is attributed to more heat intrusion into the polymer surface at higher powers, which facilitated the better cohesion of the materials, resulting in a larger shear failure load. Although higher weld powers increased the shear strength of the welding, it has a disruptive effect on the printing quality. Taken together, considering small spot size and low-energy consumption, the welding power of 250 W was selected for the following characterization studies on electrical performance and device fabrication.

The electrical resistivity of the as-sprayed and resulting electrodes was calculated using Eq. 1, where 4.532 is the correction factor, $R_s$ is the average sheet resistance (Ω/sq), ρ is the resistivity (Ωm), and tis the sheet thickness (m). $R_s$ value was obtained as 6.81 mΩ/sq from the 4-point probe device measurements while the film thickness was measured as ≈35 μm from the cross-section SEM image in FIG. 4B. As such, the resistivity was calculated as $1.08 \times 10^6$ Ω·m, which is only one order of magnitude away from the bulk resistivity of Sn (i.e., $1.1 \times 10^{-7}$ Ω·m), thereby indicating an excellent electrical conductivity to functionalize the resulting printings in numerous FE applications.

$$\rho = 4.532 \times R_s \times t \qquad (1)$$

Figure 7A:
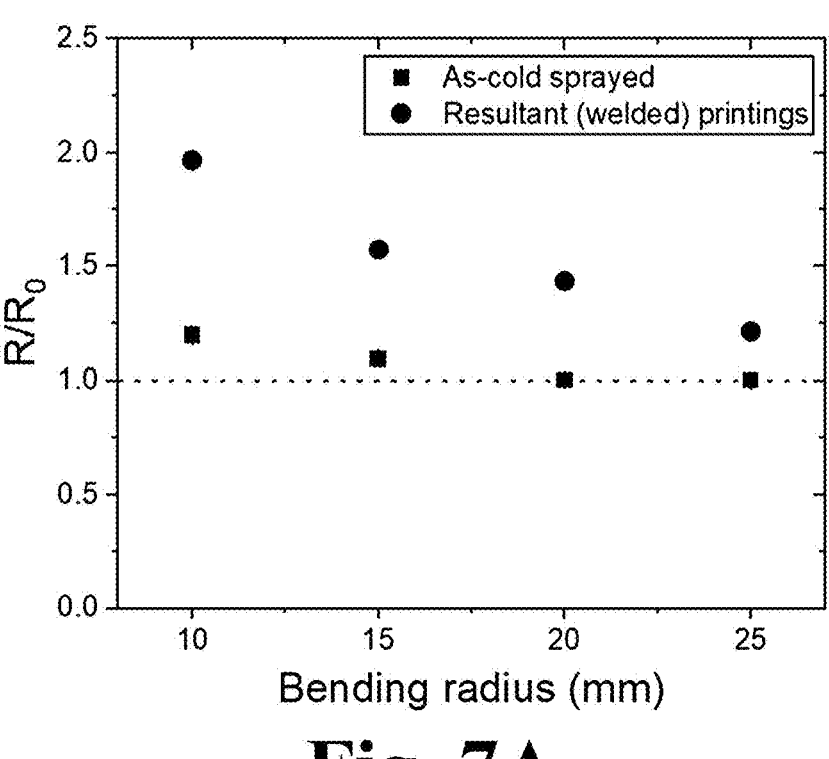
FIG. 7A is a graphic illustration $R/R_0$ as a function of bending radius.

As shown in FIG. 7A, we also investigated the electrical performance of the resultant printings for the test units, with a conduction path in a size of 5 mm×50 mm, under 1,000 bending cycles with various bending radii. For the printed samples, evenly distributed 10 ultrasonic spot welding were applied using the UW process settings given in Table 1. No noticeable change in the electrical resistance was observed in the electrodes right after the UW under no deformation.

The resultant printings, however, showed higher resistance (i.e., lower conductivity) as compared to the as-cold sprayed samples under bending cycles as given in FIG. 7A. The reason lies in the UW process, which increased the stress concentration locally in the polymer substrate. This phenomenon can be better seen from the optical microscopy analysis in FIGS. 4E-4, in which some stress contributors (e.g., sharp edges) are formed near the welding regions that could propagate with bending loading, thereby resulting in higher electrical resistance. Although the resultant printings have lower conductivity than the as-cold sprayed samples, the relative resistance (R/R₀) change stayed less than 200% for the resultant printings. At the higher bending radius (i.e., 20, 25 mm), the R/R₀ difference between the as-sprayed and the resultant printings is observed as <50%. After the bending tests, no obvious damage in the printings was detected by visual assessment, which confirms the strong adhesion between the cold spray coating and the substrate.

Figure 7B:
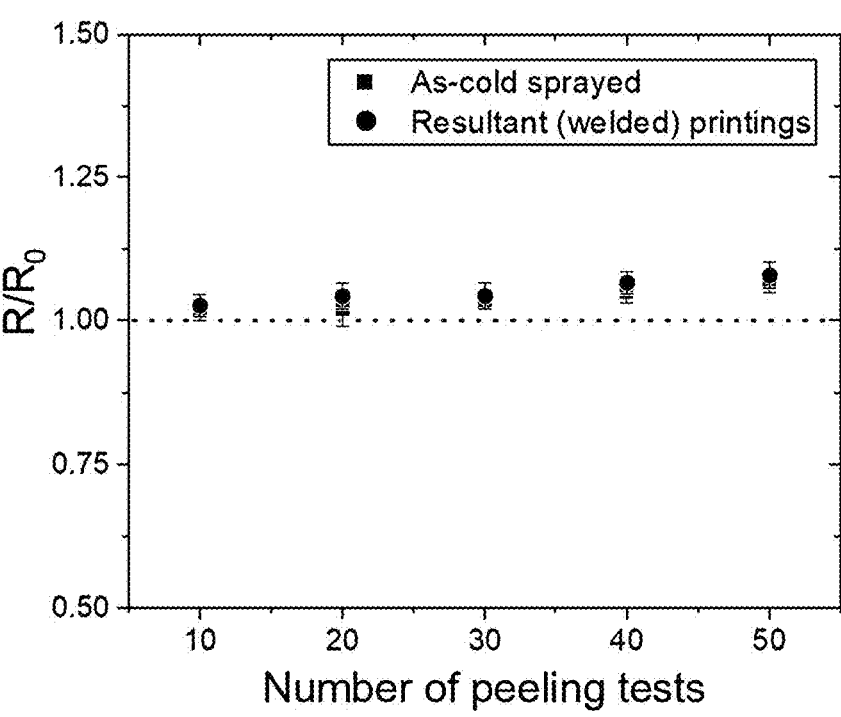
FIG. 7B is a graphic illustration of $R/R_0$ as a function of the number of peeling tests.

Adhesion performance of the printings for the test units (i.e., conduction path in a size of 5 mm×30 mm) was investigated considering the relative resistance (R/R₀) change. FIG. 7B presents the variation of the R/R₀ under peeling test cycles using transparent adhesive tape. No substantial alteration in the R/R₀ of the electrodes was observed. All the electrodes maintained high-electrical conductivity under the peeling tests. Hence, the tape test confirmed the strong adhesion between the as-cold sprayed Sn layer and the PET polymer substrate before and after the UW process, which also proved the seamless contact of the electrodes to the PET polymer substrate.

Figure 8A:
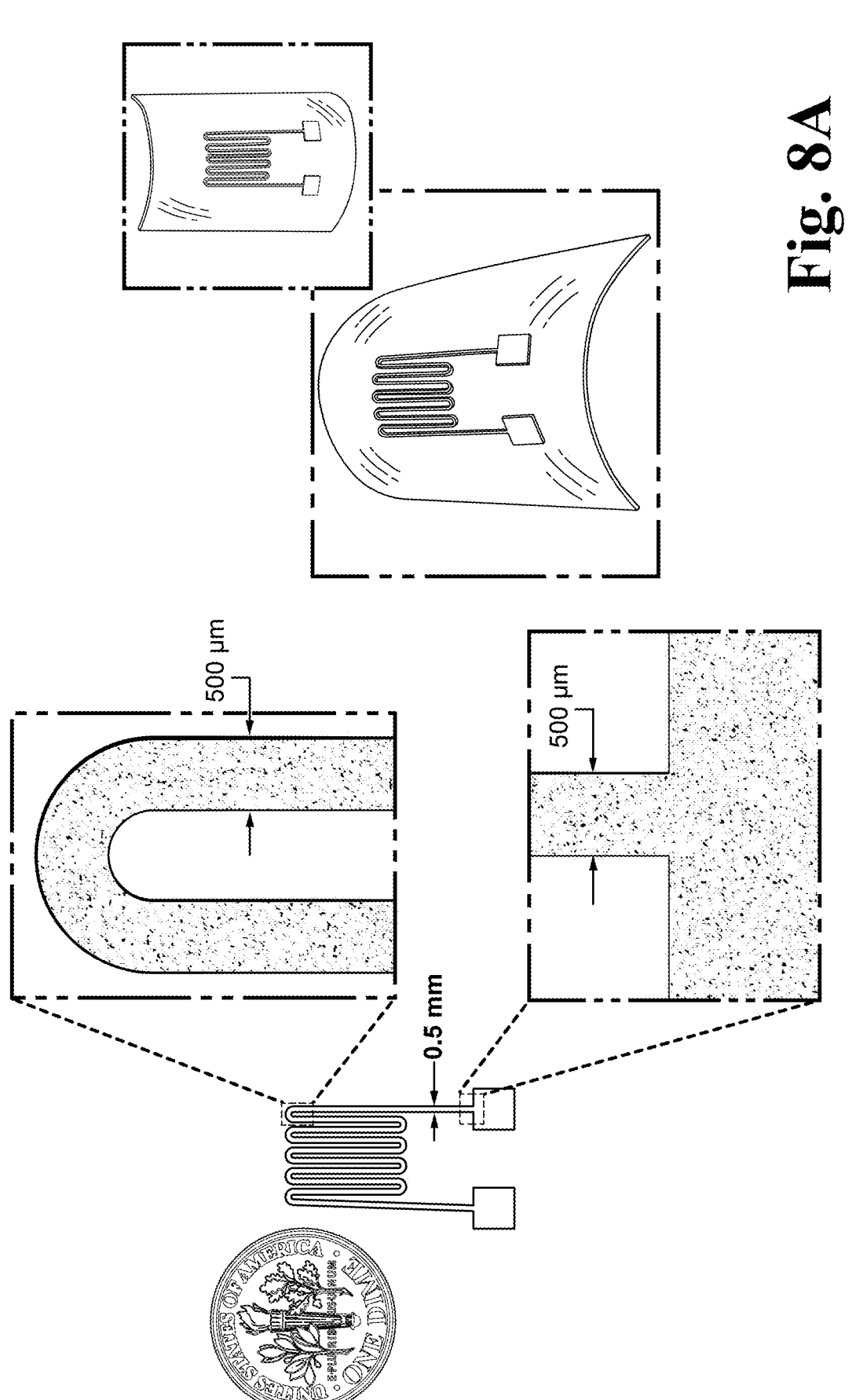
FIGS. 8A-8D are graphic illustrations of a the fabricated flexible microheater made according to FIG. 1.

To show the feasibility and applicability of the novel approach in printed electronics, a serpentine-shaped flexible resistive microheater was fabricated through the described manufacturing route. The microheater was intentionally selected as a demonstration owing to its wide applications in gas sensing, micro-electro-mechanical (MEMS) devices, biological applications, such as cell culture and DNA amplification, and most recently in rapid detection/diagnosis of COVID-19 pandemic. As shown in FIG. 8A, the microheater having a linewidth of 500 μm with ultra-fine features was precisely fabricated, which cannot be solely produced by traditional printing methods without a need of shadow mask. Moreover, based on the optical microscope analysis, no noticeable delamination in electrodes was observed after the UW process.

Figures 8B, 8C, 8D:
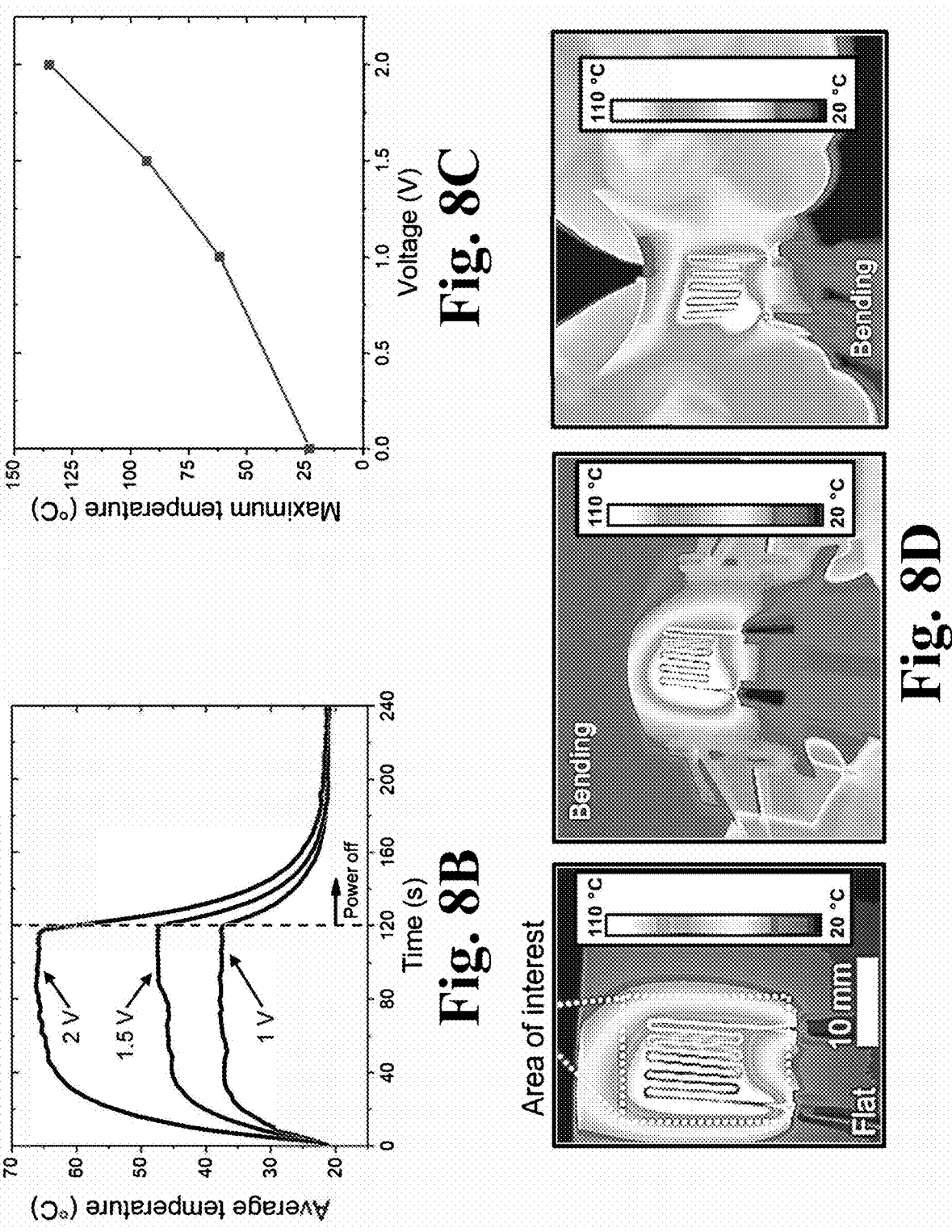
Figures 9A, 9B:
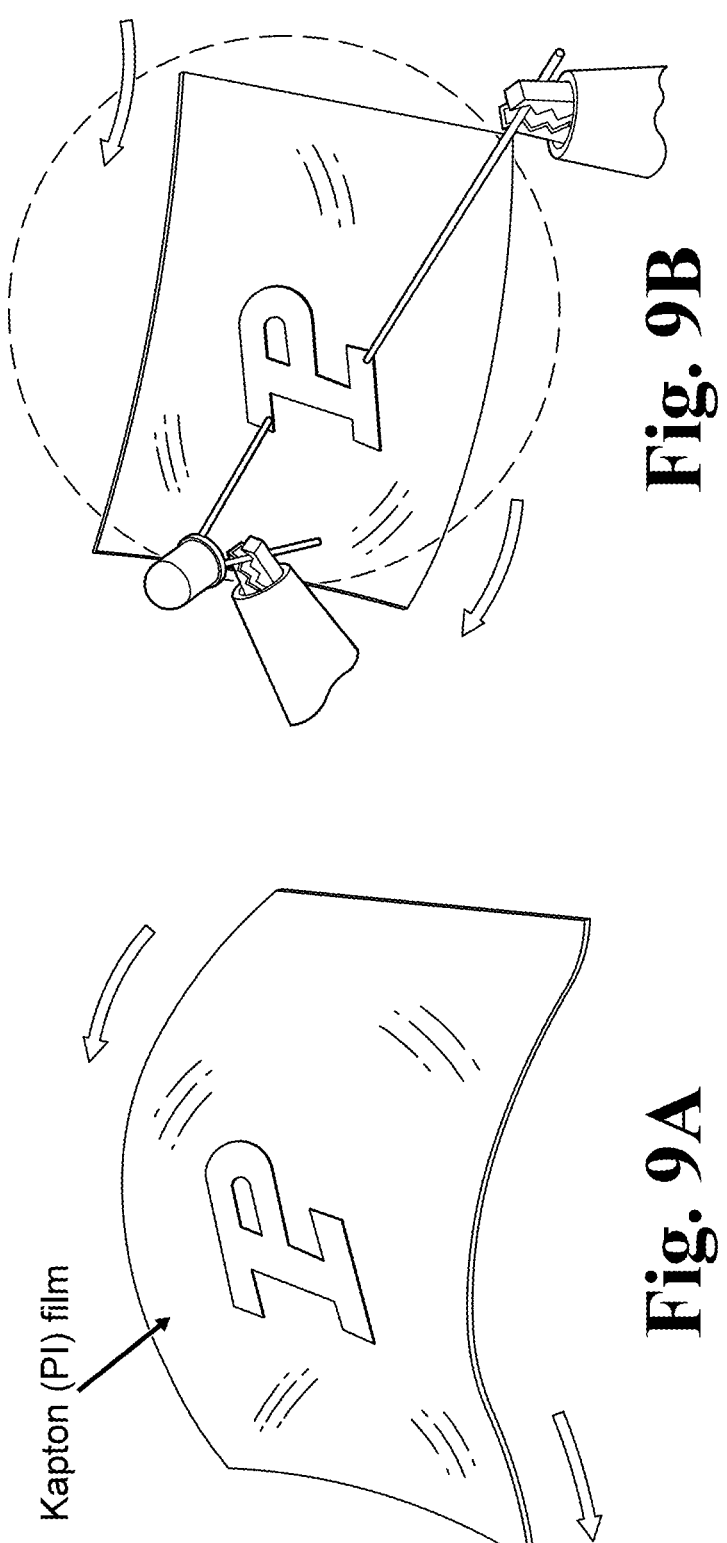
FIGS. 9A and 9B are perspective views of a device made on a thermoset (PI) film according to the process of FIG. 1.
Figure 11A:
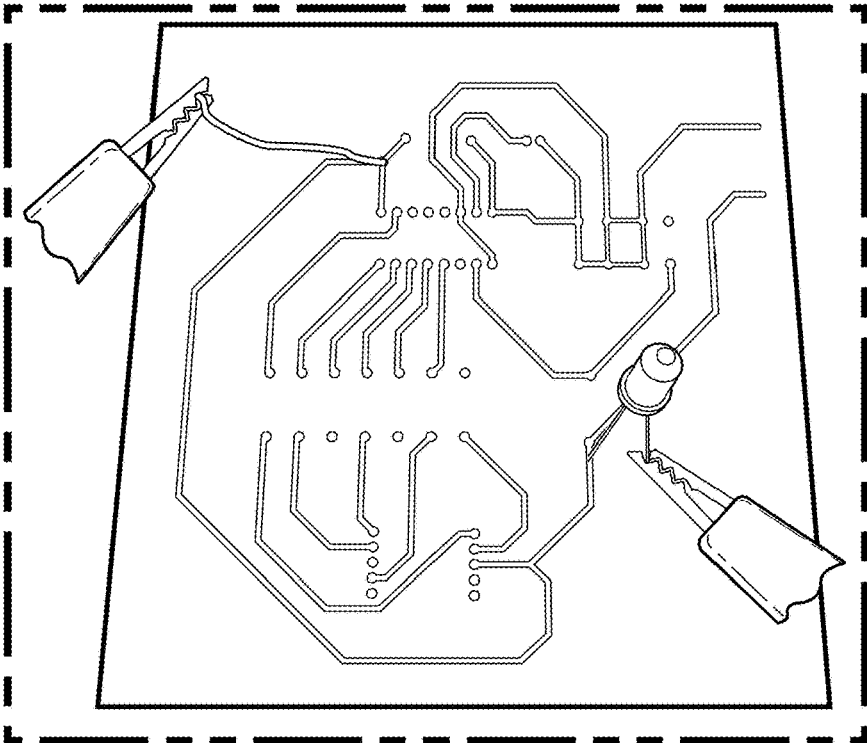
FIGS. 11A and 11B Representative images of the fabricated 3-D printed circuitry of FIG. 10 via the proposed manufacturing approach.
Figure 11B:
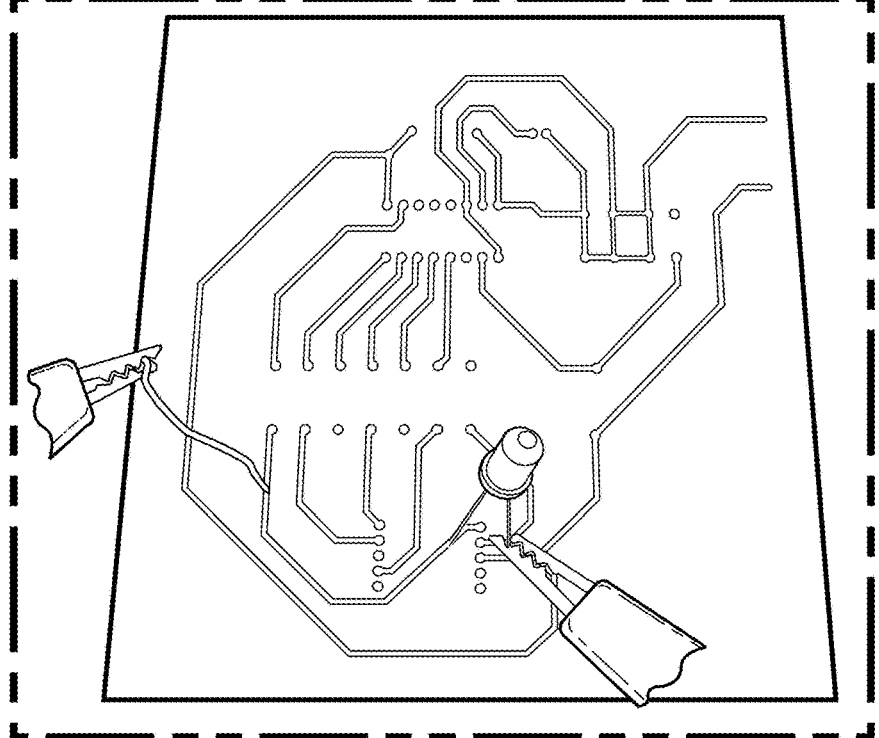

The performance of the microheater was tested under various input voltages (2.5, 5, 7.5 V) supplied by a DC power generator. FIG. 8B shows the temperature distribution averaged from a specific area of the heater. In the analysis, the voltages were supplied to the heater for 2 minutes followed by the cool-down to room temperature. The average temperature reached the highest value after 80 s, and took approximately 60 s to cool down to room temperature after turn-off the power. The local maximum temperatures in the area of interest at the applied voltages were also plotted in FIG. 8C. The microheater showed a quasi-linear trend in maximum temperature with increasing voltage values. The maximum temperature reached up to 135° C. at such a low input voltage of 2 V owing to the dense-serpentine structure of the microheater in a small area (10 mm×10 mm).

The IR camera images in FIG. 8D represent the flexible microheater under deformation, which also demonstrate the performance and stability of the heater under bending conditions. The microheater maintained its functionality under bending deformation without compromising structural integrity and reliability. The results suggest that the fabricated microheater can be successfully used in numerous applications where stable and accurate thermal stimuli are required such as wearable devices, biomedical, microfluidic, defrosting, defogging applications, and the like. The results also confirm that the described manufacturing platform can be effectively employed in the rapid and precise fabrication of microelectronics such as a microheater without the need for high-temperature post-sintering and dedicated vacuum/mask equipment.

Additionally, the proposed manufacturing route can likewise be applied to different substrate materials such as polyimide (PI), which is one of the highly demanded materials for wearable electronics, sensing, and smart film applications owing to its high thermal resistance, stability, flexibility, and excellent dielectric and mechanical properties. For that, through the described manufacturing platform, we welded the laser-cut custom designed Sn electrode, such as the Purdue logo electrode, on the PI substrate. As seen in FIG. 9, the proposed approach was successfully applied to a PI surface, proving its versatility in FE. The resultant printing maintained its flexibility and conductivity without significantly compromising intrinsic polymer and Sn coating properties. Considering cold spraying of metal particles on thermosets such as PI is currently a major challenge in the CS literature, the established manufacturing platform in this study can also address this crucial issue in CS research. More specifically, the custom-designed electrodes yielded via cold spray and subsequent laser cut, can be easily transferred on thermoset polymers via the UW process in a manner that the intrinsic advantages of the CS technique, for example low-cost, high electrical conductivity, strong adhesion strength, corrosion resistance, and the like, can be exploited in a wide range of printed flexible electronics applications. As such, the results indicate that the proposed manufacturing platform has tremendous potential for rapid and scalable production of FE on various polymer substrates with custom tailoring.

Herein is described a novel manufacturing route that enables rapid production of high-resolution and custom-designed flexible electronics without significantly compromising intrinsic polymer and functional coating properties. The novel platform sequentially involves cold spray metallization, femtosecond laser machining, and ultrasonic welding (UW) processes. First, millimeter-scale electrically conductive Tin (Sn) traces were directly written on the PET surface by cold spraying. The subsequent laser cutting leads to high-resolution (500 μm linewidth) electrodes. Lastly, through the UW process, the laser-cut electrodes are welded on a base polymer to enhance the mechanical resilience of the electrodes by constituting resilient and conformal FE. The conclusions are given as follows:

Unlike the traditional printing approaches, the novel manufacturing route requires no masking, vacuum equipment, and high-temperature sintering, thereby having the potential for effective and efficient printing on low-thermal budget substrates such as PET.

The resulting high-resolution printings showed excellent electrical conductivity ($0.91 \times 10^6$ S·m$^{-1}$), flexibility (60% elongation under the tensile test), and adhesion strength (i.e., less than 5% change in the $R/R_0$ after 50 peeling cycles) without significantly compromising intrinsic polymer and functional coating properties.

The fabricated flexible microheater (10 mm by 10 mm) demonstrated the viability and applicability of the proposed method in flexible microelectronics.

The proposed manufacturing route was also successfully applied to a thermosetting polymer, which also proved the versatility of the manufacturing route for thermosetting plastics.

Comprising low-cost coating materials (e.g., Sn powders=39$/lb) without a need for high-temperature post-annealing, the established manufacturing platform can potentially open up a promising route toward rapid, scalable, and low-cost production of flexible microelectronics.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to nigh-infinite subcombinations or variations of a subcombination.

We claim:

1. A flexible electrode, comprising:

a thin film polymer layer;

a thin film metal layer bonded to the thin film polymer layer to yield a composite strip; and a polymer substrate welded to the composite strip to yield a flexible electrode;

wherein the flexible electrode exhibits electrical conductivity of about $1.08 \times 10^6$ S·m$^{-1}$, about 60% tensile elongation, and less than 5% change in the $R/R_0$ after 50 peeling cycles; and wherein the flexible electrode is formed without annealing under ambient pressure and temperature conditions.

2. The flexible electrode of claim 1 wherein the metal is tin; wherein the thin polymer layer is selected from the group consisting of ABS, PEEK, CFRP, PET, PTFE, PI, and combinations thereof; and wherein the polymer substrate is 0.25 mm thick PET.

3. A flexible electrode device, comprising:

a polymer layer;

a metal layer bonded to the polymer layer to yield a composite strip; and a polymer substrate ultrasonically welded to the composite strip to yield a flexible electrode device;

wherein the flexible electrode device exhibits electrical conductivity of at least $1.08 \times 10^6$ S·m$^{-1}$, at least 60% tensile elongation, and less than 5% change in the $R/R_0$ after 50 peeling cycles;

wherein the flexible electrode is formed without annealing;

wherein the flexible electrode device is formed under ambient pressure and temperature conditions; and wherein the flexible electrode device can have any convenient shape.

\* \* \* \* \*